(12) United States Patent
Hauck et al.

(10) Patent No.: US 12,242,536 B2
(45) Date of Patent: Mar. 4, 2025

(54) ADJACENCY STRUCTURE FOR HETEROGENEOUS GRAPH DATA

(71) Applicant: SAP SE, Walldorf (DE)

(72) Inventors: Matthias Hauck, Frankfurt (DE); Hannes Jakschitsch, Mannheim (DE); Umang Rawat, Heidelberg (DE); Romans Kasperovics, Speyer (DE)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 17/847,836

(22) Filed: Jun. 23, 2022

(65) Prior Publication Data

US 2023/0418870 A1    Dec. 28, 2023

(51) Int. Cl.
*G06F 16/901* (2019.01)
(52) U.S. Cl.
CPC .................. *G06F 16/9024* (2019.01)

(58) Field of Classification Search
CPC .................................................. G06F 16/9024
See application file for complete search history.

(56) References Cited

U.S. PATENT DOCUMENTS

2019/0303506 A1* 10/2019 Bross .................... G06F 16/248
2022/0245147 A1*  8/2022 Segalini ............ G06F 16/24552

* cited by examiner

*Primary Examiner* — Mark D Featherstone
*Assistant Examiner* — Samuel C Sharpless, III
(74) *Attorney, Agent, or Firm* — Mintz Levin Cohn Ferris Glovsky and Popeo, P.C.

(57) ABSTRACT

A method may include generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph. A graph processing algorithm operating on the heterogeneous graph may be executed based on the adjacency structure. Related systems and computer program products are also provided.

16 Claims, 8 Drawing Sheets

Vertex Table 310

| | FirstName | LastName |
|---|---|---|
| I123456 | Taehyung | Kim |
| D123456 | Maria | Peters |

Vertex Table 320

| ProjNum | Budget |
|---|---|
| 1 | 1000000 |
| 2 | 750000 |

Vertex Table 330

| ID | Price |
|---|---|
| 1 | 1000 |
| 2 | 500 |

Vertex Table 340

| Company | Address |
|---|---|
| XYZ Corp | Address1 |
| ABC Inc | Address2 |

350

| V_ID | FirstName | LastName | ProjNum | Budget | ProductID | Price | Company | Address |
|---|---|---|---|---|---|---|---|---|
| 1 | I123456 | Taehyung | NULL | NULL | NULL | NULL | NULL | NULL |
| 2 | D123456 | Peters | NULL | NULL | NULL | NULL | NULL | NULL |
| 3 | NULL | NULL | NULL | NULL | NULL | NULL | NULL | NULL |
| 4 | NULL | NULL | 1 | 1000000 | NULL | NULL | NULL | NULL |
| 5 | NULL | NULL | 2 | 750000 | NULL | NULL | NULL | NULL |
| 6 | NULL | NULL | NULL | NULL | 1 | 1000 | NULL | NULL |
| 7 | NULL | NULL | NULL | NULL | 2 | 500 | XYZCorp | Address1 |
| 8 | NULL | NULL | NULL | NULL | NULL | NULL | ABC Inc. | Address2 |

New key column

ADJACENCY STRUCTURE FOR HETEROGENEOUS GRAPH DATA

TECHNICAL FIELD

The subject matter described herein relates generally to database processing and more specifically to adjacency structures for heterogeneous graph data having multiple vertex tables and/or edge tables.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items. Contrastingly, a relational database may store the relationships between different data items implicitly, for example, by organizing the data items into one or more database tables. A relational database may be configured to store graph data, for example, by storing the vertices of a graph in a vertex table and the edges of the graph in a separate edge table.

SUMMARY

Systems, methods, and articles of manufacture, including computer program products, are provided for an adjacency structure of a heterogeneous graph. In one aspect, there is provided a system including at least one data processor and at least one memory. The at least one memory may store instructions that cause operations when executed by the at least one data processor. The operations may include: generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph; and executing, based at least on the adjacency structure, a graph processing algorithm operating on the heterogeneous graph.

In some variations, one or more features disclosed herein including the following features can optionally be included in any feasible combination. The heterogeneous graph may be associated with a first vertex table and a second vertex table. The heterogeneous graph may be further associated with a set of vertex dictionaries comprising a first vertex dictionary associated with the first vertex table and a second vertex dictionary associated with the second vertex table.

In some variations, the first vertex dictionary may include, for a first vertex in the first vertex table of the heterogeneous graph, a first local identifier that is unique across the first vertex dictionary and a first global identifier that is unique across the set of vertex dictionaries. The second vertex dictionary may include, for a second vertex in the second vertex table of the heterogeneous graph, a second local identifier that is unique across the second vertex dictionary and a second global identifier that is unique across the set of the vertex dictionaries.

In some variations, the vertex adjacency list may specify the first vertex and the second vertex as neighboring vertices by at least identifying the first vertex based on the first global identifier and the second vertex based on the second global identifier.

In some variations, the heterogeneous graph may be associated with a first edge table and a second edge table. The heterogeneous graph may be further associated with a set of edge dictionaries comprising a first edge dictionary associated with the first edge table and a second edge dictionary associated with the second edge table.

In some variations, the first edge dictionary may include, for a first edge in the first edge table of the heterogeneous graph, a first local identifier that is unique across the first edge dictionary and a first global identifier that is unique across the set of edge dictionaries. The second edge dictionary may include, for a second edge in the second edge table of the heterogeneous graph, a second local identifier that is unique across the second edge dictionary and a second global identifier that is unique across the set of the edge dictionaries.

In some variations, the edge adjacency list may specify the first edge and the second edge as neighboring edges by at least identifying the first edge based on the first global identifier and the second edge based on the second global identifier.

In some variations, each vertex or edge in the heterogeneous graph may be uniquely identified based on a label of a corresponding table and one or more key attributes.

In some variations, the plurality of vertex tables and/or edge tables may include an arbitrary quantity of vertex tables and/or edge tables.

In some variations, the operations may further include: receiving an external key identifying a vertex or an edge in the heterogeneous graph, the external key including a key value and a label; determining that the label exists within the heterogeneous graph based at least on the label being associated to a vertex table or an edge table comprising the heterogeneous graph; determining that a key type of the key value is correct for the label; and upon determining that the key value exists within the vertex table or edge table associated with the label, retrieving, based at least on a dictionary of the vertex table or edge table associated with the label, an internal key corresponding to the external key.

In some variations, the operations may further include: receiving an internal key identifying a vertex or an edge in the heterogeneous graph; identifying, based at least on a prefix sum list of a plurality of partitions comprising the adjacency structure, a label of a vertex table or an edge table and an internal identifier corresponding to the internal key; and identifying, within a dictionary of the vertex table or the edge table having the label, external key corresponding to the internal identifier.

In some variations, each of the vertex adjacency structure and the edge adjacency structure may be a list or a matrix.

In some variations, the plurality of vertex tables and/or edge tables may be one or more documents.

In some variations, the graph processing algorithm may include one or more graph processing functions including subgraph, inverse graph, in-degree, out-degree, incoming edges, outgoing edges, neighbors, is-reachable, shortest path, shortest path one to all, k shortest paths, strongly connected components, depth first traversal, and breadth first traversal.

In another aspect, there is provided a method for an adjacency structure of a heterogeneous graph. The method may include: generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph; and executing, based at least on the adjacency structure, a graph processing algorithm operating on the heterogeneous graph.

In some variations, one or more features disclosed herein including the following features can optionally be included in any feasible combination. The heterogeneous graph may be associated with a first vertex table and a second vertex table. The heterogeneous graph may be further associated with a set of vertex dictionaries comprising a first vertex dictionary associated with the first vertex table and a second vertex dictionary associated with the second vertex table.

In some variations, the first vertex dictionary may include, for a first vertex in the first vertex table of the heterogeneous graph, a first local identifier that is unique across the first vertex dictionary and a first global identifier that is unique across the set of vertex dictionaries. The second vertex dictionary may include, for a second vertex in the second vertex table of the heterogeneous graph, a second local identifier that is unique across the second vertex dictionary and a second global identifier that is unique across the set of the vertex dictionaries. The vertex adjacency list may specify the first vertex and the second vertex as neighboring vertices by at least identifying the first vertex based on the first global identifier and the second vertex based on the second global identifier.

In some variations, the heterogeneous graph may be associated with a first edge table and a second edge table. The heterogeneous graph may be further associated with a set of edge dictionaries comprising a first edge dictionary associated with the first edge table and a second edge dictionary associated with the second edge table.

In some variations, the first edge dictionary may include, for a first edge in the first edge table of the heterogeneous graph, a first local identifier that is unique across the first edge dictionary and a first global identifier that is unique across the set of edge dictionaries. The second edge dictionary may include, for a second edge in the second edge table of the heterogeneous graph, a second local identifier that is unique across the second edge dictionary and a second global identifier that is unique across the set of the edge dictionaries. The edge adjacency list may specify the first edge and the second edge as neighboring edges by at least identifying the first edge based on the first global identifier and the second edge based on the second global identifier.

In another aspect, there is provided a computer program product including a non-transitory computer readable medium storing instructions. The instructions may cause operations may executed by at least one data processor. The operations may include: generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph; and executing, based at least on the adjacency structure, a graph processing algorithm operating on the heterogeneous graph.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a graph workspace supporting heterogeneous graphs having multiple vertex tables and/or edge tables, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3B depicts an example of a global vertex table representative of a heterogeneous graph, in accordance with some example embodiments;

When practical, similar reference numbers denote similar structures, features, or elements.

DETAILED DESCRIPTION

Figure 1:
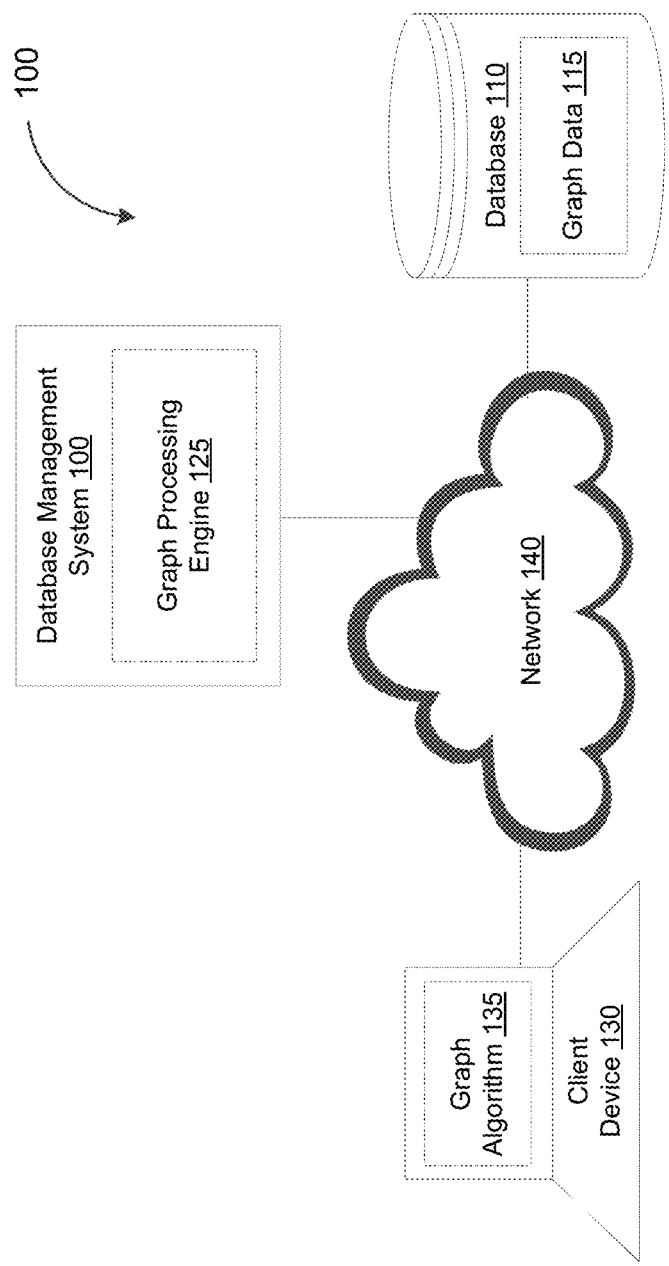
FIG. 1 depicts a system diagram illustrating an example of a graph data processing system, in accordance with some example embodiments.

Graph data may provide a power mechanism for modeling various types of interconnected data and/or data exhibiting network-like relationships. As noted, a relational database may store graph data, for example, by storing the vertices of a graph in a vertex table and the edges of the graph in an edge table. Moreover, the relational database may provide native support of various graph processing algorithms (e.g., shortest path, minimum flow, page rank, and/or the like) operating on the graph-modeled data such that graph processing algorithms can be performed within the relational database instead of by an external application or processing engine (e.g., a graph management system (GMS)). In some cases, the relational database may store a graph in a graph workspace, which is a catalog object that defines the graph in terms of the underlying vertex table and edge table.

A conventional graph workspace is configured to support homogenous or uniform typed graphs having a single vertex table and a single edge table. That is, a conventional graph workspace is capable of modeling a graph whose vertices are of the same type (e.g., by sharing the same attributes) and whose edges also of the same type (e.g., by sharing the same attributes). A heterogeneous graph is a graph whose vertices and edges are not of the same type. For example, a heterogeneous graph may have at least some vertices and/or edges with different attributes with different names, different datatypes, and/or the like. As such, instead of a single vertex table and a single edge table, a heterogeneous graph may be associated with multiple vertex tables and/or edge tables. The conventional solution for modeling a heterogeneous graph in a conventional graph workspace is to create a single global vertex table that is a union of multiple vertex tables and/or a single global edge table that is a union of multiple edge tables. The global vertex table and the global edge table may include null entries for non-common attributes. Moreover, the global vertex table and the global edge table may include a unique key for each record in the global vertex table while the global edge table may include a unique key for each record in the global edge table.

However, modeling heterogeneous graph in the foregoing manner can be cumbersome. For example, operating on a heterogeneous graph modeled as a single vertex table and a single edge table may consume excessive time and computational resources due an increase data volume and memory consumption. Moreover, modeling a heterogeneous graph as a single vertex table and a single edge table may not be entirely compatible with common graph query languages such as GraphScript and may require extra tracking to identify the actual attributes of each vertex and edge in the heterogeneous graph. For example, if a single table is used, each partition of the table could have a separate set of keys with different types and column names. Thus, even if the keys of different table partitions have the same column name and types, collisions between different partitions have to be resolved. Accordingly, in some example embodiments, a graph processing engine may be configured to implement heterogeneous graph workspaces capable of supporting a heterogeneous graph having multiple vertex tables and/or multiple edge tables. Instead of the global vertex table and the global edge table of a conventional graph workspace, the heterogeneous graph workspace may maintain separate vertex tables and edge tables. To expedite the execution of a graph processing algorithm on the heterogeneous graph, the graph processing engine may generate an adjacency structure (e.g., adjacency list, adjacency matrix, and/or the like) that enumerates the neighboring vertices and/or edges for every vertex and/or edge within the heterogeneous graph.

FIG. 1 depicts an example of a graph data processing system 100, in accordance with some example embodiments. Referring to FIG. 1, the graph data processing system 110 may include a database 110 storing a graph data 115, a database management system 120 including a graph processing engine 125, and a client device 130. The graph database 110, the database management system 120, and the client device 130 may be communicatively coupled via a network 140. In some example embodiments, the database 110 may be a relational database configured to store the graph data 115. However, it should be appreciated that the database 110 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 110 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a smartphone, a tablet computer, a wearable apparatus, a virtual assistant, an Internet-of-Things (IoT) appliance, and/or the like.

Figure 2:
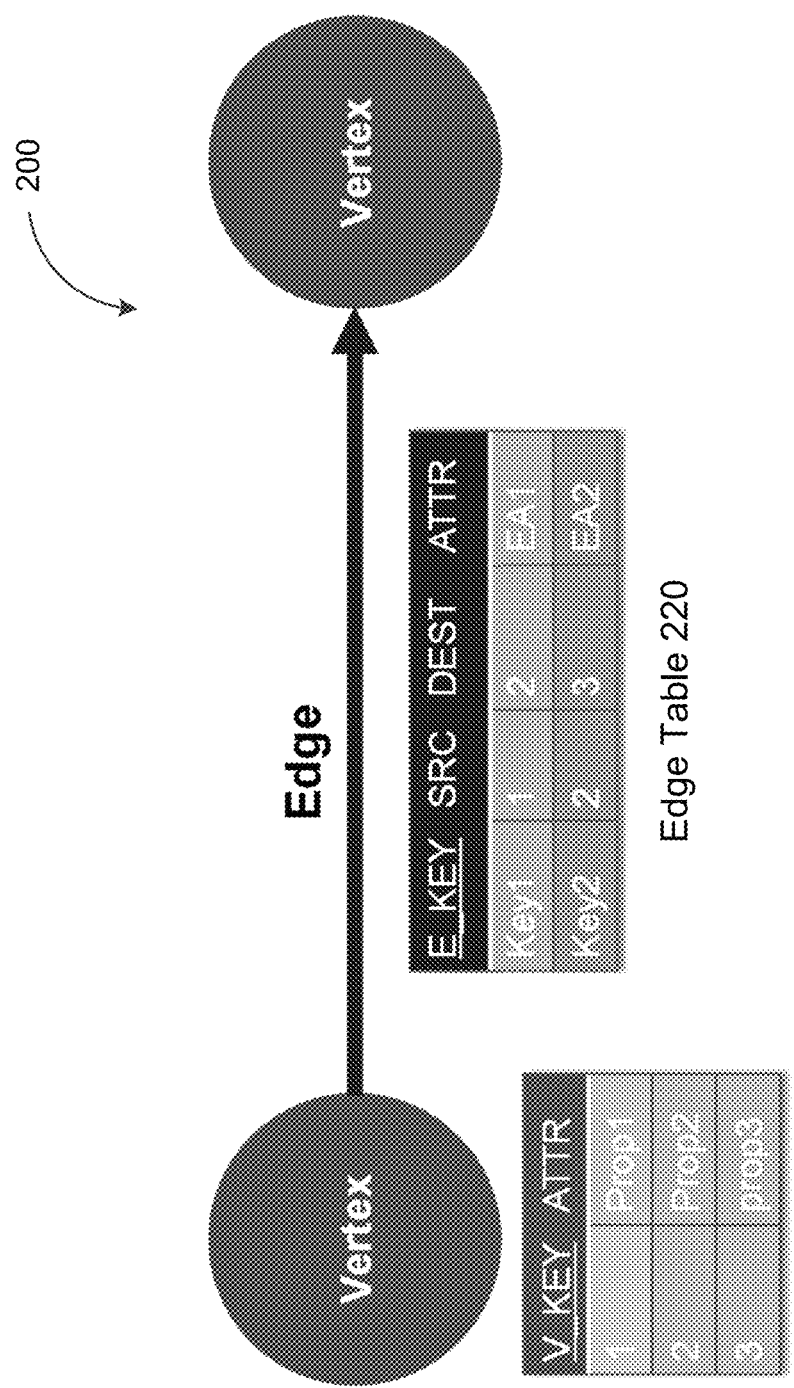
FIG. 2 depicts a schematic diagram illustrating an example of a graph workspace for a homogeneous graph, in accordance with some example embodiments.

The client device 130 may send, to the database management system 110, a request to execute a graph processing algorithm 135 that derives a solution by operating on the graph data 115 stored in the database 110. In some cases, the graph data 115 may correspond to a homogenous or uniform typed graph having a single vertex table and a single edge table. FIG. 2 depicts a schematic diagram illustrating an example of a graph workspace 200 for a homogeneous or uniformed typed graph, in accordance with some example embodiments. The vertices and the edges of a homogeneous or uniformed typed graph may share the same attributes and are thus of the same type. Accordingly, as shown in FIG. 2, the graph workspace 200 for the homogenous graph may include a single vertex table 210 containing the vertices of the homogenous graph and an edge table 220 containing the edges of the homogenous graph. Moreover, as shown in FIG. 2, the edge table 220 may include, for each edge of the homogenous graph, a source vertex and a destination vertex interconnected by the edge. For example, each vertex in the vertex table 210 may be representative of an entity while each edge in the edge table 220 may be representative of a relationship between the entities corresponding to the vertices interconnected by the edge.

Figure 3A:
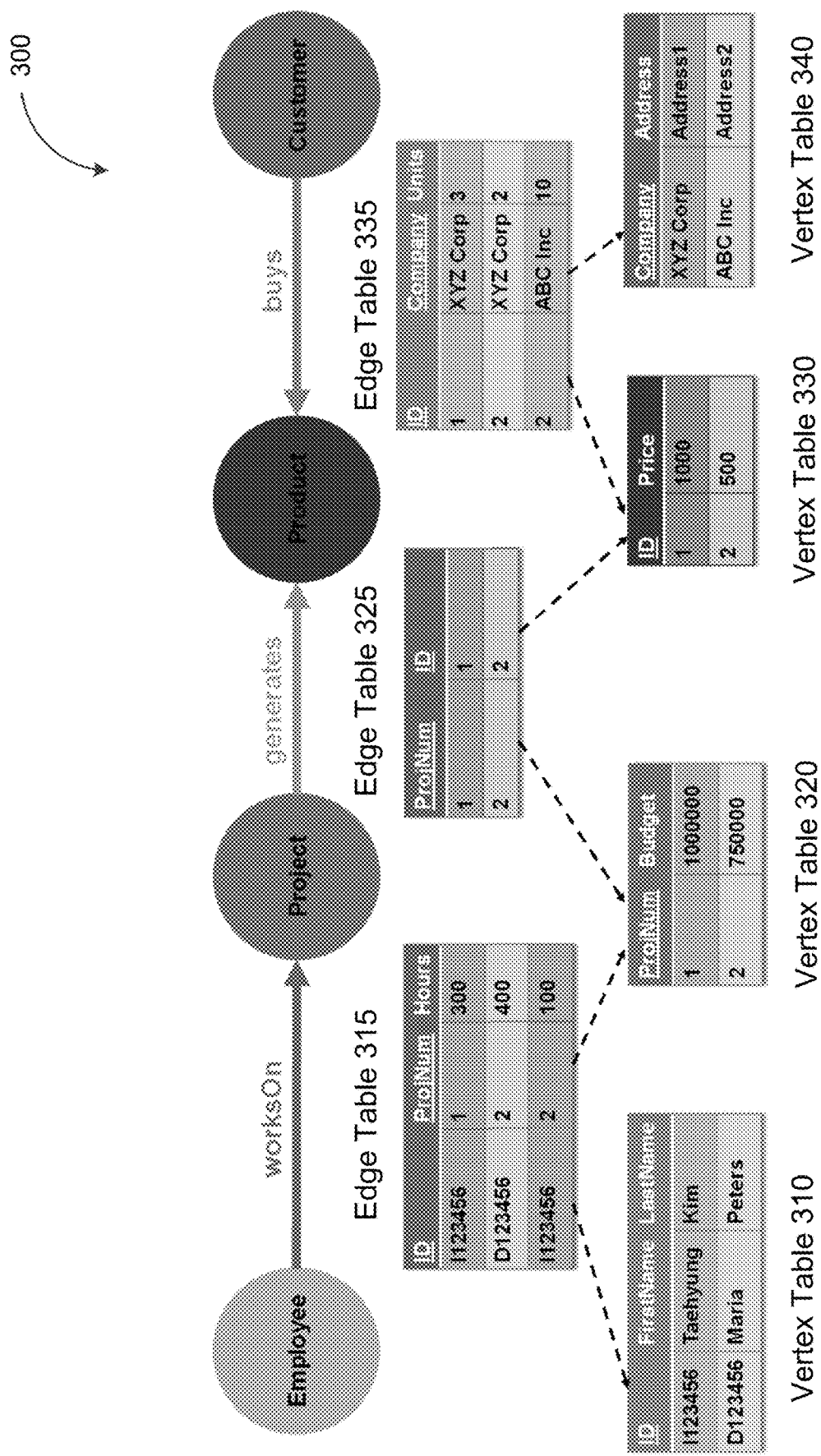
FIG. 3A depicts an example of a heterogeneous graph, in accordance with some example embodiments.

Alternatively and/or additionally, the graph data 115 may correspond to a heterogeneous graph having at least some vertices and/or edges with different attributes with different names, different datatypes, and/or the like. FIG. 3A depicts an example of a heterogeneous graph 300, in accordance with some example embodiments. For example, as shown in FIG. 3A, the heterogeneous graph 300 may include an arbitrary quantity of vertex tables such as a first vertex table 310 in which each vertex is representative of an employee, a second vertex table 320 in which each vertex is representative of a project, a third vertex table 330 in which each vertex is representative of a product, and a fourth vertex table 340 in which each vertex is representative of a customer. Moreover, FIG. 3A shows that the vertices included in the first vertex table 310, the second vertex table 320, the third vertex table 330, and the fourth vertex table 340 may be associated with different attributes with different names, different datatypes, and/or the like. For instance, the vertices included in the first vertex table 310 may be associated with the attributes "ID," "FirstName," and "LastName," which differ from the attributes "ProjNum" and "Budget" associated with the vertices included in the second vertex table 320.

Referring again to FIG. 3A, the heterogeneous graph 300 may also include an arbitrary quantity of edge tables such as a first edge table 315 storing edges that interconnect vertices from the first vertex table 310 and the second vertex table 320, a second edge table 325 storing edges that interconnect vertices from the second vertex table 320 and the third vertex table 330, and a third edge table 335 storing edges that interconnect vertices from the third vertex table 340. For example, as shown in FIG. 3A, the edges included in the first edge table 315 may be representative of the relationship "works on" between the vertices that represent employees from the first vertex table 310 and the vertices that represent projects from the second vertex table 320. Meanwhile, the edges included in the second edge table 325 may be representative of the relationship "generates" between the vertices that represent projects from the second vertex table 320 and the vertices that represent products from the third vertex table 330. As shown in FIG. 3A, the edges included in the first edge table 315, the second edge table 325, and the third edge table 335 do not share the same attributes. Instead, for example, the edges included in the first edge table 315 are associated with the attributes "ID," "ProjNum," and "Hours" whereas the edges included in the second edge table 325 are associated with the attributes "ProjNum" and "ID."

The conventional solution for modeling a heterogeneous graph in a conventional graph workspace is to create a single global vertex table that is a union of multiple vertex tables and/or a single global edge table that is a union of multiple edge tables. To further illustrate, FIG. 3B depicts an example of a global vertex table 350 representative of the heterogeneous graph 300. As shown in FIG. 3B, the global vertex table 350 may be a union of the first vertex table 310, the second vertex table 320, the third vertex table 330, and the fourth vertex table 340. In order to reconcile the differences between the attributes of the vertices included in the first vertex table 310, the second vertex table 320, the third vertex table 330, and the fourth vertex table 340, the global edge table 350 may include null entries for non-common attributes. Moreover, FIG. 3B shows that the global vertex table 350 may include a unique key (e.g., a new key column "V_ID") for each record in the global vertex table 350.

Modeling the heterogeneous graph 300 in the foregoing manner can be cumbersome. For example, operating on the heterogeneous graph 300 modeled as the global vertex table 350 and a corresponding global edge table may consume excessive time and computational resources due an increase data volume and memory consumption. Moreover, modeling the heterogeneous graph 300 as the global vertex table 350 and the corresponding global edge table may not be entirely compatible with common graph query languages such as GraphScript but may require extra tracking to identify the actual attributes of each vertex and edge in the heterogeneous graph 300. Accordingly, in some example embodiments, the graph processing engine 125 may be configured to implement heterogeneous graph workspaces capable of supporting the heterogeneous graph 300 without the aforementioned global vertex table and the global edge table of a conventional graph workspace. Instead, the heterogeneous graph workspace may model the heterogeneous graph 300 by maintaining each of the first vertex table 310, the second vertex table 320, the third vertex table 330, and the fourth vertex table 340 separately. Likewise, the heterogeneous graph workspace may model the heterogeneous graph 300 by maintaining each of the first edge table 315, the second edge table 325, and the third edge table 335 separately. Individual vertices and edges of the heterogeneous graph 300 may be uniquely identified by a label and one or more attributes denoted as key attributes.

Table 1 below depicts SQL grammar and parser extensions for supporting heterogeneous graph workspaces. As shown in Table 1, a heterogeneous graph workspace for the heterogeneous graph 300 may be defined by defining each of its constituent vertex tables (e.g., the first vertex table 310, the second vertex table 320, the third vertex table 330, and the fourth vertex table 340) and edge tables (e.g., the first edge table 315, the second edge table 325, and the third edge table 335). That is, in some example embodiments, the heterogeneous graph workspace may be capable of supporting multiple vertex tables as well as multiple edge tables. Within this paradigm, vertex attributes defined to have the same name (and occupy the same vertex table) may be required to share the same datatype as well. Likewise, edge attributes defined to have the name (and occupy the same edge table) may be required to also share the same datatype.

TABLE 1

CREATE GRAPH WORKSPACE <workspace_name> <graph_tables> [<cache_option>]
- Graph workspace name specification
    <workspace_name> ::= [<schema_name>.]<identifier>
- Vertex and edge tables specification
    <graph_tables> ::= {<vertex_table> | <edge_table>} [...]
    - A valid graph workspace must contain at least one vertex and one edge table.
    - Multiple vertex and edge tables can be specified in any order.
- Vertex table specification
    <vertex_table> = VERTEX TABLE <table_name> <key_columns> [<label_specification>]
- Edge table specification
    <edge_table> = EDGE TABLE <table_name> <source_columns> <target_columns>
        <key_columns> [<label_specification>]
- Key columns specification
    <key_columns> ::= KEY COLUMN <column_name_list>
    <column_name_list> ::= <column_name> [ { , <column_name> } [...] ]
    <column_name> ::= <identifier>

TABLE 1-continued

- Label specification
  <label_specification> ::= LABEL <string_literal>
- Edge source and target columns specification
  <source_columns> ::= SOURCE COLUMN <column_name_list> [<vertex_table_reference>]
  <target_columns> ::= TARGET COLUMN <column_name_list> [<vertex_table_reference>]
  <vertex table_reference> ::= REFERENCES <table_name>

In some example embodiments, when defining the heterogeneous graph workspace of the heterogeneous graph 300, one or more of the vertex tables and/or edge tables associated with the heterogeneous graph 300 may be associated with an optional label. In the event the definition of the heterogeneous graph workspace does not specify a label for a particular edge table or vertex table of the heterogeneous graph 300, the label defaults to the corresponding table name. Moreover, when defining the heterogeneous graph workspace of the heterogeneous graph 300, the labels assigned to the vertices and edges must be unique within the graph workspace. Accordingly, when operating on the heterogeneous graph 300, each vertex and edge within the heterogeneous graph 300 may be uniquely identifiable by the corresponding label and one or more attributes denoted as key attributes.

As noted, in the example of the heterogeneous graph 300 shown in FIG. 3A, the edges included in the first edge table 315 may be representative of the relationship "works on" between the vertices that represent employees from the first vertex table 310 and the vertices that represent projects from the second vertex table 320. Meanwhile, the edges included in the second edge table 325 may be representative of the relationship "generates" between the vertices that represent projects from the second vertex table 320 and the vertices that represent products from the third vertex table 330. It should be appreciated that when defining the edge tables of the heterogeneous graph 300, which stores edges interconnecting individual pairs of source vertices and destination vertices, the source vertices and destination vertices included in each individual edge table may be required to refer to vertices from the same vertex tables. For example, as shown in FIG. 3A, the source vertices "ID" in the first edge table 315 of the heterogeneous graph 300 are from the first vertex table 310 while the target vertices "ProjNum" in the first edge table 315 of the heterogeneous graph 300 are from the second vertex table 320.

When defining the heterogeneous graph workspace of the heterogeneous graph 300, which includes multiple vertex tables, it may be mandatory to specify the vertex table referenced by the source vertices and target vertices of each edge table. Moreover, the datatype and order of the source vertex attributes and target vertex attributes may be required to match the datatype and order of the key attributes in the corresponding vertex tables.

Table 2 below depicts an example of a workspace definition, which includes one or more SQL statement creating a heterogeneous graph workspace representative of the heterogeneous graph 300.

TABLE 2

CREATE GRAPH WORKSPACE MY_SCHEMA.COMPANY_GRAPH
  VERTEX TABLE EMPLOYEES
    KEY COLUMN ID
    LABEL 'Employee'
  VERTEX TABLE PROJECTS
    KEY COLUMN PROJNUM TABLE 2-continued LABEL 'Project'
  EDGE TABLE PROJECT_ASSIGNMENTS
    SOURCE COLUMN ID REFERENCES EMPLOYEES
    TARGET COLUMN PROJNUM REFERENCES PROJECTS
    KEY COLUMN ID, PROJNUM
    LABEL 'Assignments'
  EDGE TABLE PROJECT_OUTCOMES
    SOURCE COLUMN PROJNUM REFERENCES PROJECTS
    TARGET COLUMN ID REFERENCES PRODUCTS
    KEY COLUMN PROJNUM, ID
  VERTEX TABLE PRODUCTS
    KEY COLUMN ID
    LABEL 'Product'
  VERTEX TABLE CUSTOMERS
    KEY COLUMN COMPANY
  EDGE TABLE SALES
    SOURCE COLUMN ID REFERENCES PRODUCTS
    TARGET COLUMN COMPANY REFERENCES CUSTOMERS
    KEY COLUMN ID, COMPANY
    LABEL 'Sales';

In some example embodiments, the graph processing engine 125 may be generate one or more secondary indices based on the graph data 115 stored in the database 110. For example, the graph processing engine 125 may generate one or more adjacency structures, such as adjacency lists, adjacency matrices, and/or the like, for the graph data 115 stored in the database 110. The graph processing engine 125 may generate the adjacency structures in order to expedite the execution of one or more graph processing algorithms, such as the graph processing algorithm 135, operating on the graph data 115. In cases where the graph data 115 includes a heterogeneous graph having multiple vertex tables and/or edge tables, the graph processing engine 125 may generate a vertex adjacency structure based on one or more vertex tables of the heterogeneous graph and an edge adjacency structure based one or more edge tables of the heterogeneous graph.

Figure 4A:
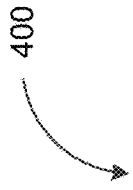
FIG. 4A depicts input tables associated with another example of a heterogeneous graph, in accordance with some example embodiments.

To further illustrate, FIG. 4A depicts the input tables associated with another example of a heterogeneous graph 400, in accordance with some example embodiments. Referring to FIG. 4A, the heterogeneous graph 400 may include a first vertex table 410 (VT1) and a second vertex table 420 (VT2). Furthermore, the heterogeneous graph 400 may include a first edge table 415 storing edges interconnecting source vertices from the first vertex table 410 and destination vertices from the second vertex table 420 (VT1→VT2) as well as a second edge table 415 storing edges interconnecting sources vertices from the second vertex table 420 and destination vertices from the second vertex tables 420 (VT2→VT2). As noted, since the heterogeneous graph 400 includes multiple vertex tables and edge tables, the corresponding heterogeneous graph workspace may include a unique label for each table in order to enable differentiation therebetween. Moreover, in some cases such as the example of the heterogeneous graph 400 shown in FIG. 4A, an edge table may reference the same vertex table in that the source vertex and the destination vertex included in the edge table may originate from the same vertex table.

Figure 4B:
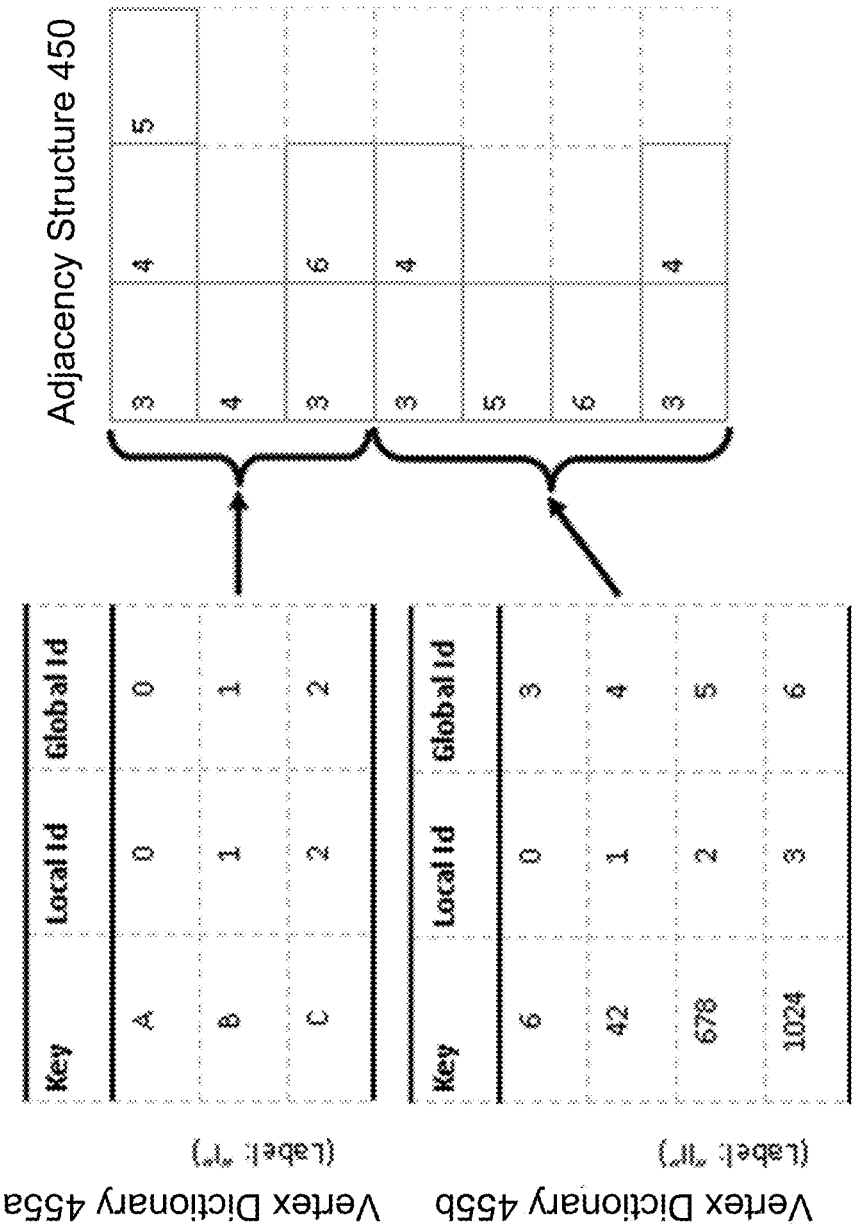
FIG. 4B depicts an example of an adjacency structure associated with a heterogeneous graph, in accordance with some example embodiments.

FIG. 4B depicts an example of an adjacency structure 450 associated with the heterogeneous graph 400, in accordance with some example embodiments. As noted, the heterogeneous graph 400 may include multiple vertex tables and edge tables. For example, FIG. 4A shows that the heterogeneous graph 400 may include the first vertex table 410 and the second vertex table 420 as well as the first edge table 415 and the second edge table 425. Each of the first vertex table 410, the second vertex table 420, the first edge table 415, and the second edge table 425 may be associated with a separate dictionary, resulting in two separate sets of dictionaries (e.g., a set of vertex dictionaries and a set of edge dictionaries).

FIG. 4B depicts the set of vertex dictionaries associated with the heterogeneous graph 400, which includes a first vertex dictionary 455a associated with the first vertex table 410 and a second vertex dictionary 455b associated with the second vertex table 420. As shown in FIG. 4B, each vertex dictionary may include, for each vertex in a corresponding vertex table, a local identifier that is unique within the individual vertex dictionary and a global identifier that is unique across the entire set of vertex dictionaries. In some cases, the global identifier may be derived from the local identifiers, for example, by an offset for each dictionary. The adjacency structure 450, which in this case is a vertex adjacency vertex, may enumerate neighboring vertices by at least identifying each vertex using each vertex's global identifier.

Likewise, each edge dictionary may include, for each edge in a corresponding edge table, a local identifier that is unique within the individual edge dictionary and a global identifier that is unique across the entire set of edge dictionaries. The edge adjacency structure of the heterogeneous graph 400 may thus enumerate neighboring edges by identifying each edge using each edge's global identifier.

As noted, each of the first vertex table 410, the second vertex table 420, the first edge table 415, and the second edge table 425 of the heterogeneous graph 400 may be associated with a separate dictionary. Accordingly, the dictionary of the heterogeneous graph 400 may be divided based on the constituent tables and their corresponding labels. This results in two sets of dictionaries (e.g., a set of vertex dictionaries and a set of edge dictionaries) for the heterogeneous graph 400, with each table of the heterogeneous graph 400 having its own corresponding dictionary. Within this paradigm, the same keys may be reused across multiple tables (labels) multiple times as long as the keys are individually unique for each of the tables. Each dictionary may have a valid key datatype as type independently from the other dictionaries of the heterogeneous graph 400, which is more efficient than a type neutral one. Moreover, each dictionary may be responsible for an internal identifier range, which may or may not overlap with the identifier range of another dictionary associated with the heterogeneous graph 400.

Referring again to FIGS. 4A-B, the topology of the heterogeneous graph 400 may nevertheless be covered by the single vertex adjacency structure 450 and a single corresponding edge adjacency structure. Various implementations of the vertex adjacency structure and edge adjacency structure described herein supports feature selection, such as when both directions of a relationship present in the heterogeneous graph 400 (e.g., incoming and outgoing) are required. In particular, the triplets from the first edge table 415 and the second edge table 425 that describe an edge of the heterogeneous graph 400 (e.g., edge key, source vertex, and target vertex) are inserted into the edge adjacency structure using their respective global identifiers. Although the resulting adjacency structures are not updatable without partitioning (e.g., a partitioned adjacency structure), they provide comparable performance characteristics the adjacency structures of homogenous or uniform typed graphs.

Similar to the dictionaries of the heterogeneous graph 400 (and the corresponding keys), the attributes of the heterogeneous graph 400 may also be partitioned across the first vertex table 410, the second vertex table 420, the first edge table 415, and the second edge table 425. For example, the attributes of each table may be stored separately (e.g., within the database 110), to avoid storing unnecessary attributes and the generating of dummy entries. According to some example embodiments, the attributes of the heterogeneous graph 400 may remain accessible via their respective internal identifiers which, as shown in FIG. 4B, may be mapped to a global identifier within the adjacency structures of the heterogeneous graph 400. For instance, based on the global identifier of a vertex or an edge, a corresponding attribute partition may be identified before the corresponding attributes are identified within the partition using the local identifier of the vertex or the edge. During runtime, attempts to access an nonexistent attribute (e.g., an attribute that is absent from the vertex tables and edge tables of the heterogeneous graph 400) may result in a NULL output from the graph processing engine 125.

In some example embodiments, the graph processing engine 125 may be configured to perform key translation in order to map between the external keys and the internal keys of an heterogeneous graph (e.g., the example of the heterogeneous graph 300 shown in FIGS. 3A-B or the example of the heterogeneous graph 400 shown in FIGS. 4A-B). An external key, which may represent a vertex or an edge of a heterogeneous graph, may include the key value of a supported key type and a label that is a string or SQL identifier. To translate an external key to an internal key (e.g., for a vertex or an edge), the graph processing engine 125 may verify whether that key value exists in the heterogeneous graph and/or convert the external key into a corresponding internal key. For example, the graph processing engine 125 may first determine whether the label included with the external key exists within the heterogeneous graph. That is, the graph processing engine 125 may determine whether the label included with the external key refers to a vertex table or an edge table of the heterogeneous graph. If the label included with the external key exists within the heterogeneous graph, the graph processing engine 125 may verify whether the key type is correct for the given label. In the event the key type is correct for the given label, the graph processing engine 125 may determine if the key value exists and, if so, obtain its internal identifier value from the dictionary of the given label (e.g. the dictionary of the vertex table or edge table having the label).

Conversely, the graph processing engine 125 may also translate an internal key to an external key (e.g., for a vertex or an edge) of a heterogeneous graph. To do so, the graph processing engine 125 may determine the label (e.g., the table of the heterogeneous graph assigned the label) and the local identifier associated with an internal key using a prefix sum list of the global offsets of the various vertex or edge table partitions. Once the label (e.g., the table of the heterogeneous graph assigned the label) is identified, the graph processing engine 125 may obtain the external key using the local identifier associated with the internal key from the dictionary of the label.

Figure 5:
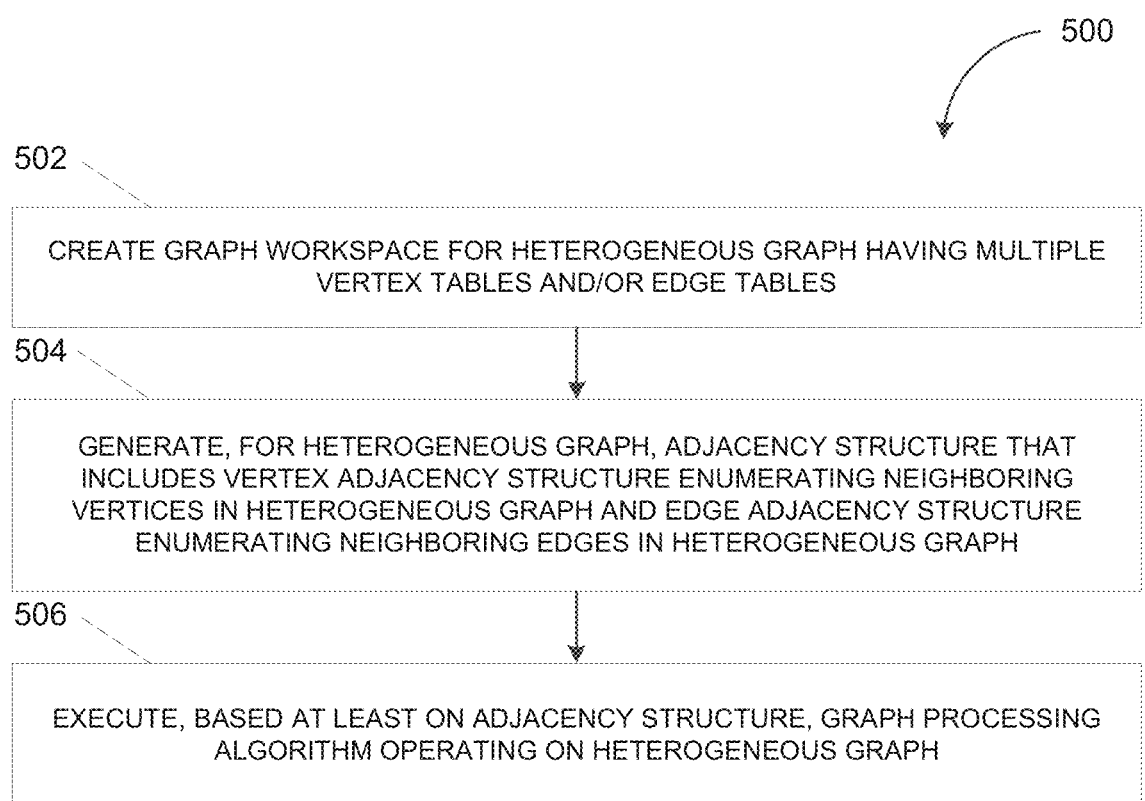
FIG. 5 depicts a flowchart illustrating an example of a process for an adjacency structure of a heterogeneous graph, in accordance with some example embodiments.

FIG. 5 depicts a flowchart illustrating an example of a process 500 for an adjacency structure of a heterogeneous graph, in accordance with some example embodiments.

Referring to FIGS. 1-5, the process 500 may be performed by the database management system 120, for example, the graph processing engine 125, to support operations on a heterogeneous graph having multiple vertex table and/or edge tables such as the example of the heterogeneous graph 300 shown in FIGS. 3A-B and the example of the heterogeneous graph 400 shown in FIGS. 4A-B.

At 502, the database management system 120 may create a graph workspace for a heterogeneous graph having multiple vertex tables and/or edge tables. For example, the database management system 120 may receive, from the client device 130, a workspace definition that includes one or more SQL statements for creating a heterogeneous graph workspace representative of a heterogeneous graph such as the heterogeneous graph 300 shown in FIGS. 3A-B and the heterogeneous graph 400 shown in FIG. 4A-B. The graph workspace of the heterogeneous graph may represent the heterogeneous graph as a collection of separate vertex tables and edge tables forming the heterogeneous graph. In some cases, the vertex tables and edge tables of the heterogeneous graph may be a collection of documents.

At 504, the database management system 120 may generate, for the heterogeneous graph, an adjacency structure that includes a vertex adjacency structure enumerating neighboring vertices in the heterogeneous graph and an edge adjacency structure enumerating neighboring edges in the heterogeneous graph. In some example embodiments, the graph processing engine 125 may generate a vertex adjacency structure based on one or more vertex tables of a heterogeneous graph and an edge adjacency structure based one or more edge tables of the heterogeneous graph. For example, FIG. 4B depicts an example of the adjacency structure 450, which is a vertex adjacency structure that enumerates the neighboring vertices of the heterogeneous graph 400. As shown in FIG. 4A, the heterogeneous graph 400 may include the first vertex table 410 and the second vertex table 420 as well as the first edge table 415 and the second edge table 425. Each of the first vertex table 410, the second vertex table 420, the first edge table 415, and the second edge table 425 may be associated with a separate dictionary, resulting in two separate sets of dictionaries (e.g., a set of vertex dictionaries and a set of edge dictionaries). For instance, FIG. 4B shows that each vertex dictionary may include, for each vertex in a corresponding vertex table, a local identifier that is unique within the individual vertex dictionary and a global identifier that is unique across the entire set of vertex dictionaries. Accordingly, the adjacency structure 450, which in the example shown in FIG. 4B is a vertex adjacency vertex, may specify neighboring vertices by at least identifying each vertex using each vertex's global identifier. Meanwhile, since each edge dictionary may include, for each edge in a corresponding edge table, a local identifier that is unique within the individual edge dictionary and a global identifier that is unique across the entire set of edge dictionaries, the edge adjacency structure of the heterogeneous graph 400 may enumerate neighboring edges by identifying each edge using each edge's global identifier.

At 506, the database management system 120 may execute, based at least on the adjacency structure, a graph processing algorithm operating on the heterogeneous graph. For example, the graph processing engine 125 may receive, from the client device 130, the graph processing algorithm 135, which may include one or more graph processing functions including, for example, subgraph, inverse graph, in-degree, out-degree, incoming edges, outgoing edges, neighbors, is-reachable, shortest path, shortest path one to all, k shortest paths, strongly connected components, depth first traversal, breadth first traversal, and/or the like. The graph processing algorithm 135 may operate on a heterogeneous graph (e.g., the heterogeneous graph 300, the heterogeneous graph 400, and/or the like), which may be stored in the database 110 as a part of the corresponding heterogeneous graph workspace. To expedite the execution of the graph processing algorithm 135, the graph processing engine 125 may perform the graph processing algorithm 135 based on at least a portion of the adjacency structure (e.g., the vertex adjacency structure, the edge adjacency structure, and/or the like) associated with the heterogeneous graph.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph; and executing, based at least on the adjacency structure, a graph processing algorithm operating on the heterogeneous graph.

Example 2: The system of Example 1, wherein the heterogeneous graph is associated with a first vertex table and a second vertex table, and wherein the heterogeneous graph is further associated with a set of vertex dictionaries comprising a first vertex dictionary associated with the first vertex table and a second vertex dictionary associated with the second vertex table.

Example 3: The system of Example 2, wherein the first vertex dictionary includes, for a first vertex in the first vertex table of the heterogeneous graph, a first local identifier that is unique across the first vertex dictionary and a first global identifier that is unique across the set of vertex dictionaries, and wherein the second vertex dictionary includes, for a second vertex in the second vertex table of the heterogeneous graph, a second local identifier that is unique across the second vertex dictionary and a second global identifier that is unique across the set of the vertex dictionaries.

Example 4: The system of Example 3, wherein the vertex adjacency list specifies the first vertex and the second vertex as neighboring vertices by at least identifying the first vertex based on the first global identifier and the second vertex based on the second global identifier.

Example 5: The system of any one of Examples ito 4, wherein the heterogeneous graph is associated with a first edge table and a second edge table, and wherein the heterogeneous graph is further associated with a set of edge dictionaries comprising a first edge dictionary associated with the first edge table and a second edge dictionary associated with the second edge table.

Example 6: The system of Example 5, wherein the first edge dictionary includes, for a first edge in the first edge table of the heterogeneous graph, a first local identifier that is unique across the first edge dictionary and a first global identifier that is unique across the set of edge dictionaries, and wherein the second edge dictionary includes, for a second edge in the second edge table of the heterogeneous graph, a second local identifier that is unique across the second edge dictionary and a second global identifier that is unique across the set of the edge dictionaries.

Example 7: The system of Example 6, wherein the edge adjacency list specifies the first edge and the second edge as neighboring edges by at least identifying the first edge based on the first global identifier and the second edge based on the second global identifier.

Example 8: The system of any one of Examples 1 to 7, wherein each vertex or edge in the heterogeneous graph is uniquely identified based on a label of a corresponding table and one or more key attributes.

Example 9: The system of any one of Examples 1 to 8, wherein the plurality of vertex tables and/or edge tables include an arbitrary quantity of vertex tables and/or edge tables.

Example 10: The system of any one of Examples 1 to 9, wherein the operations further comprise: receiving an external key identifying a vertex or an edge in the heterogeneous graph, the external key including a key value and a label; determining that the label exists within the heterogeneous graph based at least on the label being associated to a vertex table or an edge table comprising the heterogeneous graph; determining that a key type of the key value is correct for the label; and upon determining that the key value exists within the vertex table or edge table associated with the label, retrieving, based at least on a dictionary of the vertex table or edge table associated with the label, an internal key corresponding to the external key.

Example 11: The system of any one of Examples 1 to 10, wherein the operations further comprise: receiving an internal key identifying a vertex or an edge in the heterogeneous graph; identifying, based at least on a prefix sum list of a plurality of partitions comprising the adjacency structure, a label of a vertex table or an edge table and an internal identifier corresponding to the internal key; and identifying, within a dictionary of the vertex table or the edge table having the label, external key corresponding to the internal identifier.

Example 12: The system of any one of Examples 1 to 11, wherein each of the vertex adjacency structure and the edge adjacency structure comprise a list or a matrix.

Example 13: The system of any one of Examples 1 to 12, wherein the plurality of vertex tables and/or edge tables comprises one or more documents.

Example 14: The system of any one of Examples 1 to 13, wherein the graph processing algorithm includes one or more graph processing functions including subgraph, inverse graph, in-degree, out-degree, incoming edges, outgoing edges, neighbors, is-reachable, shortest path, shortest path one to all, k shortest paths, strongly connected components, depth first traversal, and breadth first traversal.

Example 15: A computer-implemented method, comprising: generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph; and executing, based at least on the adjacency structure, a graph processing algorithm operating on the heterogeneous graph.

Example 16: The method of Example 15, wherein the heterogeneous graph is associated with a first vertex table and a second vertex table, and wherein the heterogeneous graph is further associated with a set of vertex dictionaries comprising a first vertex dictionary associated with the first vertex table and a second vertex dictionary associated with the second vertex table.

Example 17: The method of Example 16, wherein the first vertex dictionary includes, for a first vertex in the first vertex table of the heterogeneous graph, a first local identifier that is unique across the first vertex dictionary and a first global identifier that is unique across the set of vertex dictionaries, wherein the second vertex dictionary includes, for a second vertex in the second vertex table of the heterogeneous graph, a second local identifier that is unique across the second vertex dictionary and a second global identifier that is unique across the set of the vertex dictionaries, and wherein the vertex adjacency list specifies the first vertex and the second vertex as neighboring vertices by at least identifying the first vertex based on the first global identifier and the second vertex based on the second global identifier.

Example 18: The method of any one of Examples 15 to 17, wherein the heterogeneous graph is associated with a first edge table and a second edge table, and wherein the heterogeneous graph is further associated with a set of edge dictionaries comprising a first edge dictionary associated with the first edge table and a second edge dictionary associated with the second edge table.

Example 19: The method of Example 18, wherein the first edge dictionary includes, for a first edge in the first edge table of the heterogeneous graph, a first local identifier that is unique across the first edge dictionary and a first global identifier that is unique across the set of edge dictionaries, wherein the second edge dictionary includes, for a second edge in the second edge table of the heterogeneous graph, a second local identifier that is unique across the second edge dictionary and a second global identifier that is unique across the set of the edge dictionaries, and wherein the edge adjacency list specifies the first edge and the second edge as neighboring edges by at least identifying the first edge based on the first global identifier and the second edge based on the second global identifier.

Example 20: A non-transitory computer readable medium storing instructions, which when executed by at least one data processor, result in operations comprising: generating, for a heterogeneous graph comprising a plurality of vertex tables and/or edge tables, an adjacency structure including a vertex adjacency structure specifying a plurality of neighboring vertices in the heterogeneous graph and an edge adjacency structure specifying a plurality of neighboring edges in the heterogeneous graph; and executing, based at least on the adjacency structure, a graph processing algorithm operating on the heterogeneous graph.

Figure 6:
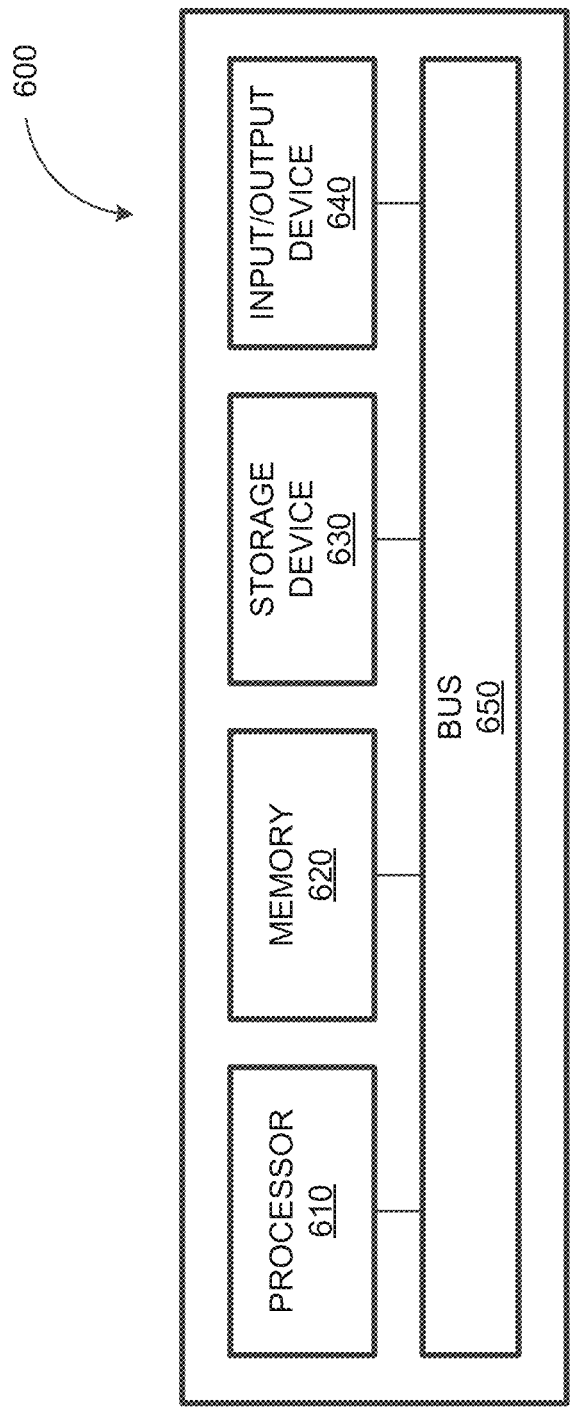
FIG. 6 depicts a block diagram illustrating an example of a computing system, in accordance with some example embodiments.

FIG. 6 depicts a block diagram illustrating an example of a computing system 600 consistent with implementations of the current subject matter. Referring to FIGS. 1-6, the computing system 600 can be used to implement the database management system 110 and/or any components therein.

As shown in FIG. 6, the computing system 600 can include a processor 610, a memory 620, a storage device 630, and an input/output device 640. The processor 610, the memory 620, the storage device 630, and the input/output device 640 can be interconnected via a system bus 650. The processor 610 is capable of processing instructions for execution within the computing system 600. Such executed instructions can implement one or more components of, for example, the database management system 110. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a solid state drive, a floppy disk device, a hard disk device, an optical disk device, or a tape device, or other suitable persistent storage means. The input/output device 640 provides input/output operations for the computing system 600. In some example embodiments, the input/output device 640 includes a keyboard and/or pointing device. In various implementations, the input/output device 640 includes a display unit for displaying graphical user interfaces.

According to some example embodiments, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
generating, for each of a plurality of vertex tables and edge tables of a heterogeneous graph, an adjacency structure including a vertex adjacency structure specifying a plurality of neighboring vertices in the heterogeneous graph and an edge adjacency structure specifying a plurality of neighboring edges in the heterogeneous graph,
wherein the plurality of vertex tables comprise a first vertex table and a second vertex table that do not share at least one attribute, wherein the first vertex table and the second vertex table are associated with a first vertex dictionary and a second vertex dictionary, wherein the first vertex dictionary includes, for a first vertex in the first vertex table, a first local identifier that is unique across the first vertex dictionary and a first global identifier that is unique across a set of vertex dictionaries, wherein the second vertex dictionary includes, for a second vertex in the second vertex table, a second local identifier that is unique across the second vertex dictionary and a second global identifier that is unique across the set of vertex dictionaries; and
executing, based at least on the generated adjacency structure, graph processing for a database management system using the plurality of vertex tables and the edge tables of heterogeneous graph including the first vertex dictionary and the second vertex dictionary.

2. The system of claim 1, wherein the vertex adjacency structure specifies the first vertex and the second vertex as neighboring vertices by at least identifying the first vertex based on the first global identifier and the second vertex based on the second global identifier.

3. The system of claim 1, wherein the heterogeneous graph is associated with a first edge table and a second edge table, and wherein the heterogeneous graph is further associated with a set of edge dictionaries comprising a first edge dictionary associated with the first edge table and a second edge dictionary associated with the second edge table.

4. The system of claim 3, wherein the first edge dictionary includes, for a first edge in the first edge table of the heterogeneous graph, a first local identifier that is unique across the first edge dictionary and a first global identifier that is unique across the set of edge dictionaries, and wherein the second edge dictionary includes, for a second edge in the second edge table of the heterogeneous graph, a second local identifier that is unique across the second edge dictionary and a second global identifier that is unique across the set of edge dictionaries.

5. The system of claim 4, wherein the edge adjacency structure specifies the first edge and the second edge as neighboring edges by at least identifying the first edge based on the first global identifier and the second edge based on the second global identifier.

6. The system of claim 1, wherein each vertex or edge in the heterogeneous graph is uniquely identified based on a label of a corresponding table and one or more key attributes.

7. The system of claim 1, wherein the plurality of vertex tables and/or edge tables include an arbitrary quantity of vertex tables and/or edge tables.

8. The system of claim 1, wherein the operations further comprise:
receiving an external key identifying a vertex or an edge in the heterogeneous graph, the external key including a key value and a label;
determining that the label exists within the heterogeneous graph based at least on the label being associated to a vertex table or an edge table comprising the heterogeneous graph;
determining that a key type of the key value is correct for the label; and
upon determining that the key value exists within the vertex table or edge table associated with the label, retrieving, based at least on a dictionary of the vertex table or edge table associated with the label, an internal key corresponding to the external key.

9. The system of claim 1, wherein the operations further comprise:
receiving an internal key identifying a vertex or an edge in the heterogeneous graph;
identifying, based at least on a prefix sum list of a plurality of partitions comprising the adjacency structure, a label of a vertex table or an edge table and an internal identifier corresponding to the internal key; and
identifying, within a dictionary of the vertex table or the edge table having the label, external key corresponding to the internal identifier.

10. The system of claim 1, wherein each of the vertex adjacency structure and the edge adjacency structure comprise a list or a matrix.

11. The system of claim 1, wherein the plurality of vertex tables and/or edge tables comprises one or more documents.

12. The system of claim 1, wherein the graph processing includes one or more graph processing functions including subgraph, inverse graph, in-degree, out-degree, incoming edges, outgoing edges, neighbors, is-reachable, shortest path, shortest path one to all, k shortest paths, strongly connected components, depth first traversal, and breadth first traversal.

13. A computer-implemented method, comprising:
generating, for each of a plurality of vertex tables and edge tables of a heterogeneous graph, an adjacency structure including a vertex adjacency structure specifying a plurality of neighboring vertices in the heterogeneous graph and an edge adjacency structure specifying a plurality of neighboring edges in the heterogeneous graph,
wherein the plurality of vertex tables comprise a first vertex table and a second vertex table that do not share at least one attribute, wherein the first vertex table and the second vertex table are associated with a first vertex dictionary and a second vertex dictionary, wherein the first vertex dictionary includes, for a first vertex in the first vertex table, a first local identifier that is unique across the first vertex dictionary and a first global identifier that is unique across a set of vertex dictionaries, wherein the second vertex dictionary includes, for a second vertex in the second vertex table, a second local identifier that is unique across the second vertex dictionary and a second global identifier that is unique across the set of vertex dictionaries; and executing, based at least on the generated adjacency structure, graph processing for a database management system using the plurality of vertex tables and the edge tables of heterogeneous graph including the first vertex dictionary and the second vertex dictionary.

14. The method of claim 13, wherein the heterogeneous graph is associated with a first edge table and a second edge table, and wherein the heterogeneous graph is further associated with a set of edge dictionaries comprising a first edge dictionary associated with the first edge table and a second edge dictionary associated with the second edge table.

15. The method of claim 14, wherein the first edge dictionary includes, for a first edge in the first edge table of the heterogeneous graph, a first local identifier that is unique across the first edge dictionary and a first global identifier that is unique across the set of edge dictionaries, wherein the second edge dictionary includes, for a second edge in the second edge table of the heterogeneous graph, a second local identifier that is unique across the second edge dictionary and a second global identifier that is unique across the set of the edge dictionaries, and wherein the edge adjacency structure specifies the first edge and the second edge as neighboring edges by at least identifying the first edge based on the first global identifier and the second edge based on the second global identifier.

16. A non-transitory computer readable medium storing instructions, which when executed by at least one data processor, result in operations comprising:

generating, for each of a plurality of vertex tables and edge tables of a heterogeneous graph, an adjacency structure including a vertex adjacency structure specifying a plurality of neighboring vertices in the heterogeneous graph and an edge adjacency structure specifying a plurality of neighboring edges in the heterogeneous graph, wherein the plurality of vertex tables comprise a first vertex table and a second vertex table that do not share at least one attribute, wherein the first vertex table and the second vertex table are associated with a first vertex dictionary and a second vertex dictionary, wherein the first vertex dictionary includes, for a first vertex in the first vertex table, a first local identifier that is unique across the first vertex dictionary and a first global identifier that is unique across a set of vertex dictionaries, wherein the second vertex dictionary includes, for a second vertex in the second vertex table, a second local identifier that is unique across the second vertex dictionary and a second global identifier that is unique across the set of vertex dictionaries; and executing, based at least on the generated adjacency structure, graph processing for a database management system using the plurality of vertex tables and the edge tables of heterogeneous graph including the first vertex dictionary and the second vertex dictionary.

\* \* \* \* \*